United States Patent
Uchiyama

(10) Patent No.: US 6,771,239 B1
(45) Date of Patent: Aug. 3, 2004

(54) METHOD FOR MANUFACTURING AN ACTIVE MATRIX SUBSTRATE

(75) Inventor: Kenji Uchiyama, Hotaka-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/572,383

(22) Filed: May 16, 2000

(30) Foreign Application Priority Data

May 17, 1999 (JP) .......................... 11-136051
May 27, 1999 (JP) .......................... 11-148010

(51) Int. Cl.[7] ................................ G09G 3/36
(52) U.S. Cl. ..................... 345/87; 345/92; 345/93; 345/98
(58) Field of Search .................. 345/87, 92, 93, 345/98, 707; 349/123, 128, 139, 140, 143, 153, 190, 43; 250/370.01; 73/152.03; 257/59; 438/158

(56) References Cited

U.S. PATENT DOCUMENTS

| | | | |
|---|---|---|---|
| 4,873,516 A | * 10/1989 | Castleberry | 340/784 |
| 5,574,292 A | * 11/1996 | Takahashi et al. | 257/59 |
| 5,706,022 A | * 1/1998 | Hato | 345/92 |
| 5,837,568 A | * 11/1998 | Yoneda et al. | 438/147 |
| 5,930,607 A | * 7/1999 | Satou | 438/158 |
| 5,989,945 A | * 11/1999 | Yudasaka et al. | 438/149 |
| 6,141,078 A | * 10/2000 | Morii et al. | 349/155 |
| 6,168,980 B1 | * 1/2001 | Yamazaki et al. | 438/162 |
| 6,195,139 B1 | * 2/2001 | Yamazaki et al. | 349/43 |
| 6,294,822 B1 | * 9/2001 | Nakata | 257/461 |
| 6,300,927 B1 | * 10/2001 | Kubota et al. | 345/92 |
| 6,304,308 B1 | * 10/2001 | Saito et al. | 349/155 |
| 6,324,904 B1 | * 12/2001 | Ishikawa et al. | 73/152.03 |
| 6,423,974 B1 | * 7/2002 | Ishikawa et al. | 250/370.01 |
| 6,476,897 B1 | * 11/2002 | Watanabe et al. | 349/139 |

FOREIGN PATENT DOCUMENTS

| | | | |
|---|---|---|---|
| JP | 11-111609 | 4/1999 | |
| JP | 11-116050 | 4/1999 | |
| JP | 11-195580 | 7/1999 | |
| JP | 11-195581 | 7/1999 | |
| JP | 2000-330479 | * 11/2000 | .......... 345/87 |

* cited by examiner

Primary Examiner—Bipin Shalwala
Assistant Examiner—Prabodh Dharia
(74) Attorney, Agent, or Firm—Michael T. Gabrik

(57) ABSTRACT

In a liquid crystal device, spherical-shaped semiconductor devices are mounted in a dispersive fashion on a wiring pattern extending toward a liquid crystal sealing region from input terminals connected to a flexible board. Each spherical-shaped semiconductor device is produced by forming a semiconductor device element on the surface of a spherical-shaped semiconductor material. In production of an electro-optical panel, MIS transistors are first produced in the form of spherical-shaped semiconductor devices, and then one spherical-shaped semiconductor device is installed in each pixel on an active matrix substrate, thereby allowing the MIS transistors to be produced at an optimum temperature without restriction caused by heat resistance of the substrate. When the active matrix substrate is adhesively bonded to an opposite substrate, the spherical-shaped semiconductor devices serve as spacers which allow the substrates to be precisely spaced a desired distance apart from each other.

29 Claims, 15 Drawing Sheets

[FIG. 1]
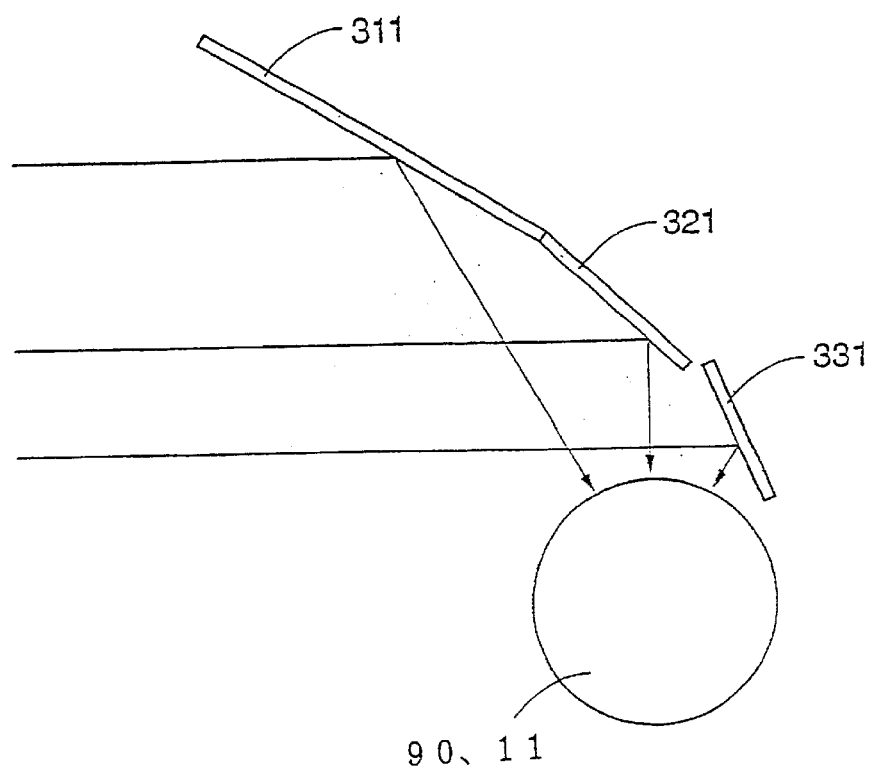

[FIG. 2]
(A)
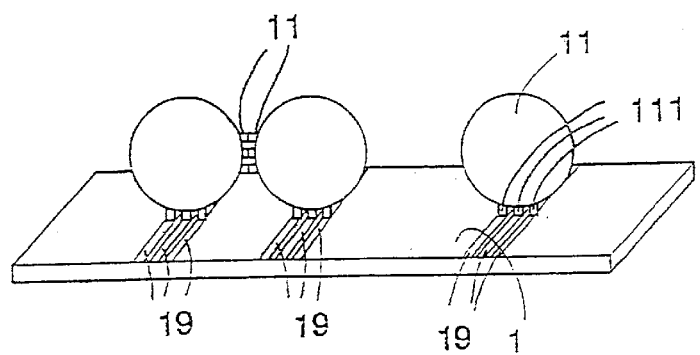
(B)
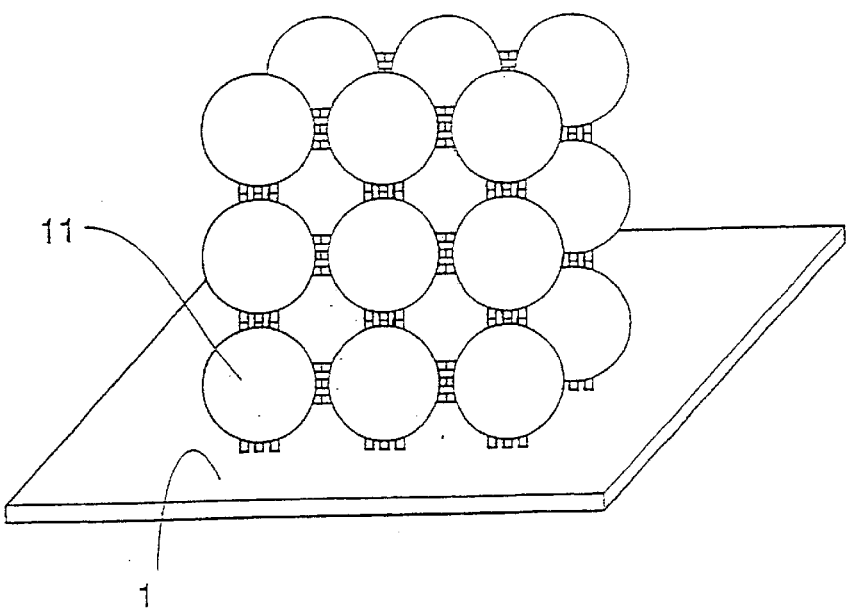

[FIG. 2]
(C)
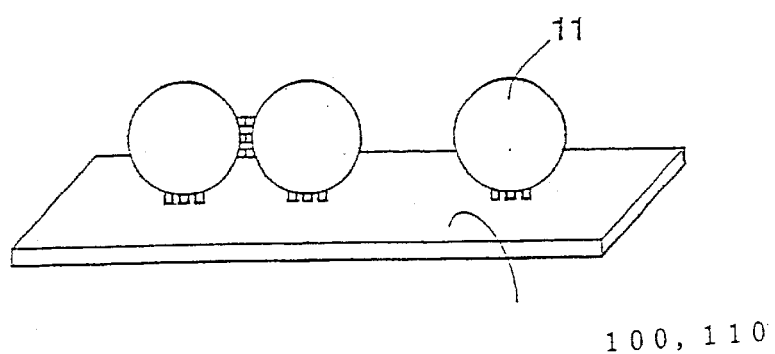

[FIG. 3]
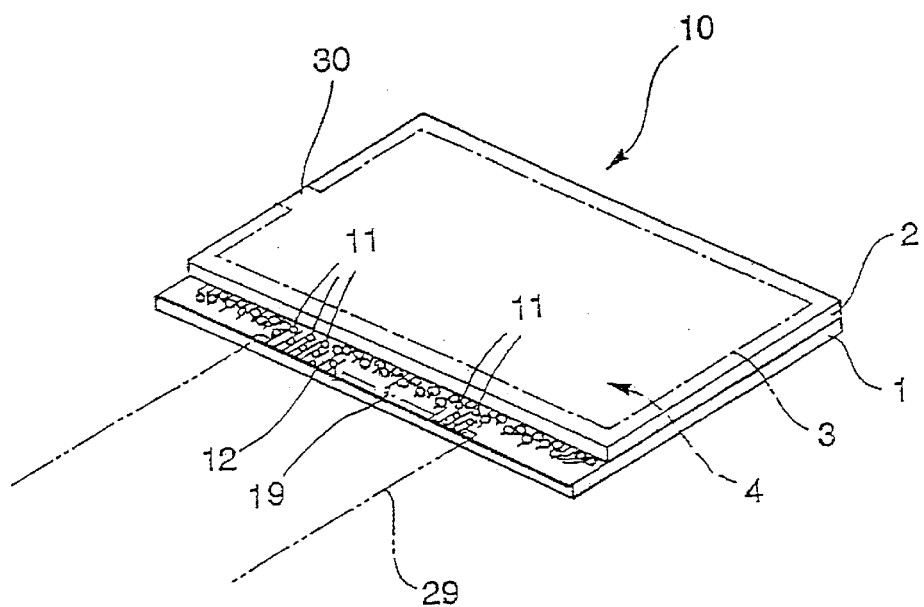

[FIG. 4]
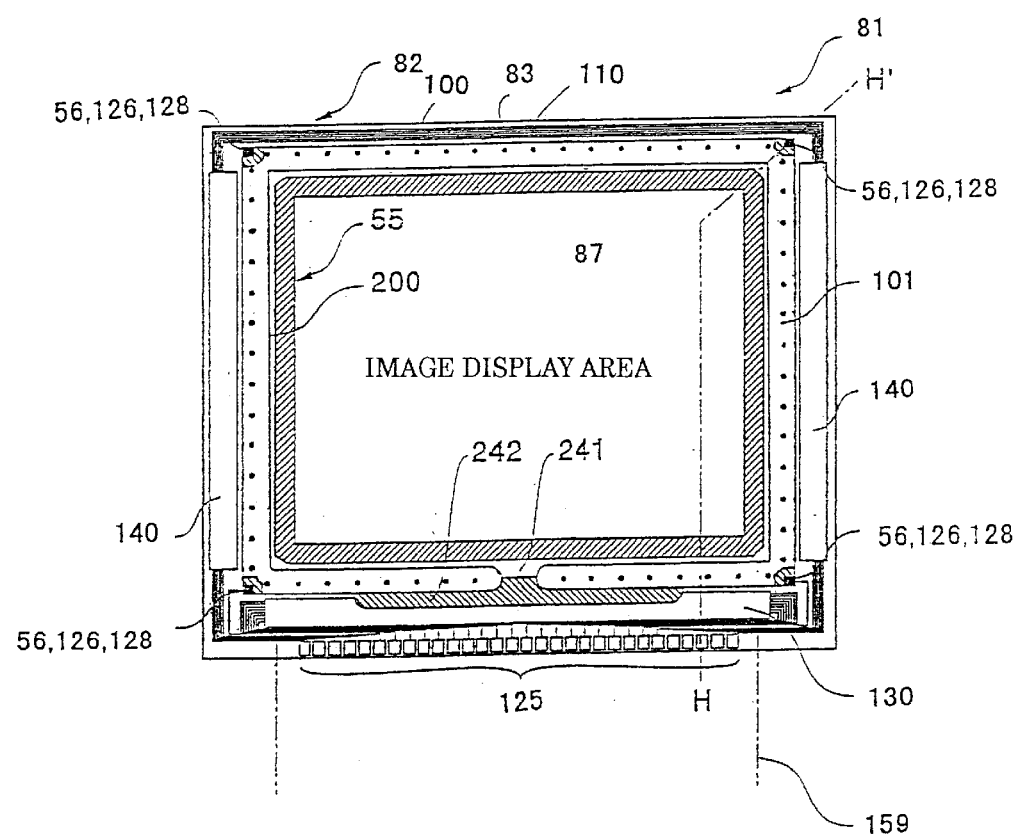

[FIG. 5]
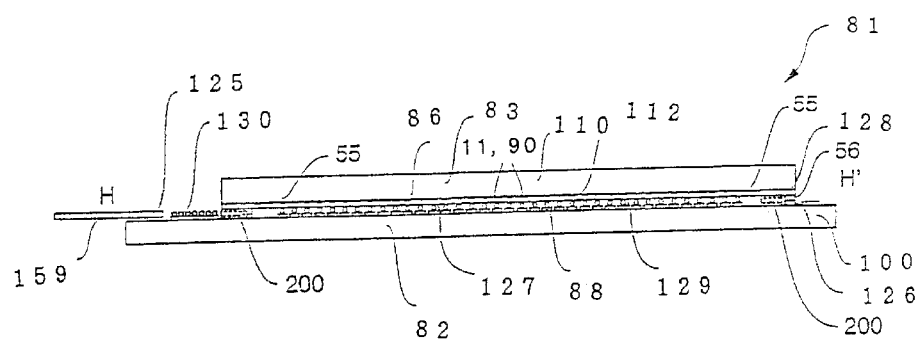

[FIG. 6]
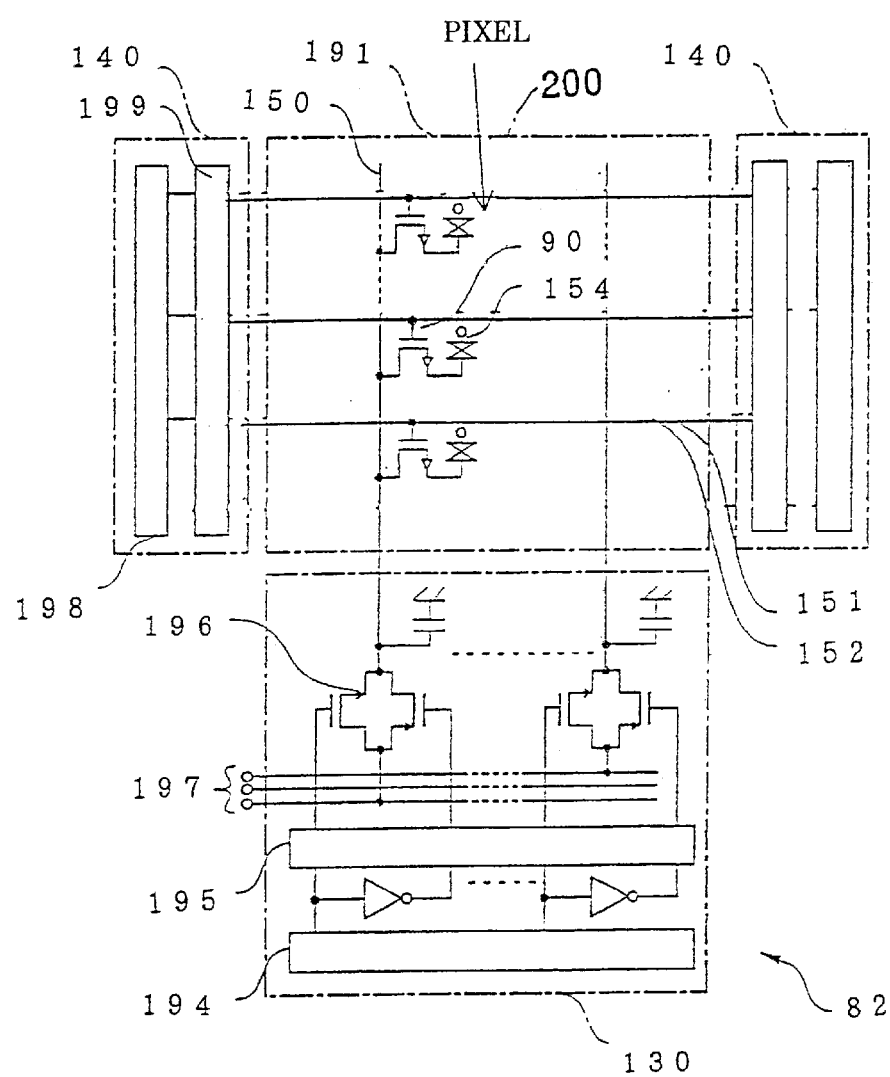

[FIG. 7]
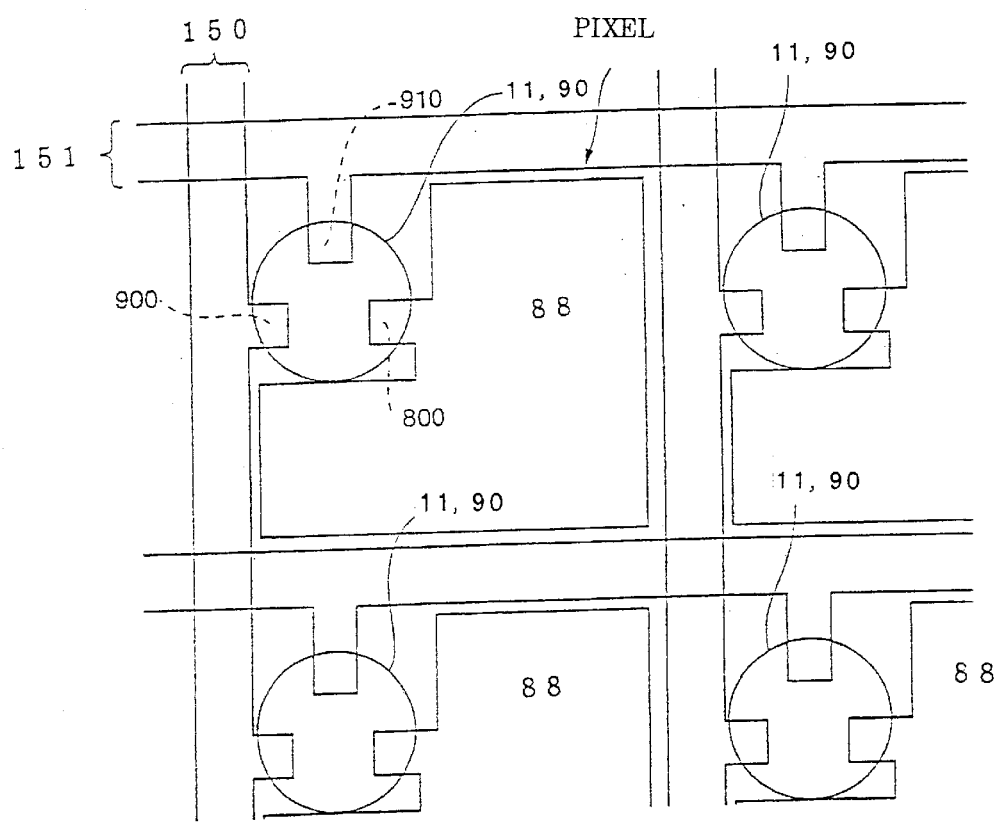
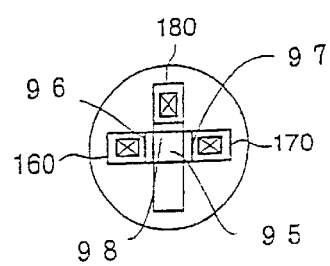

[FIG .8]
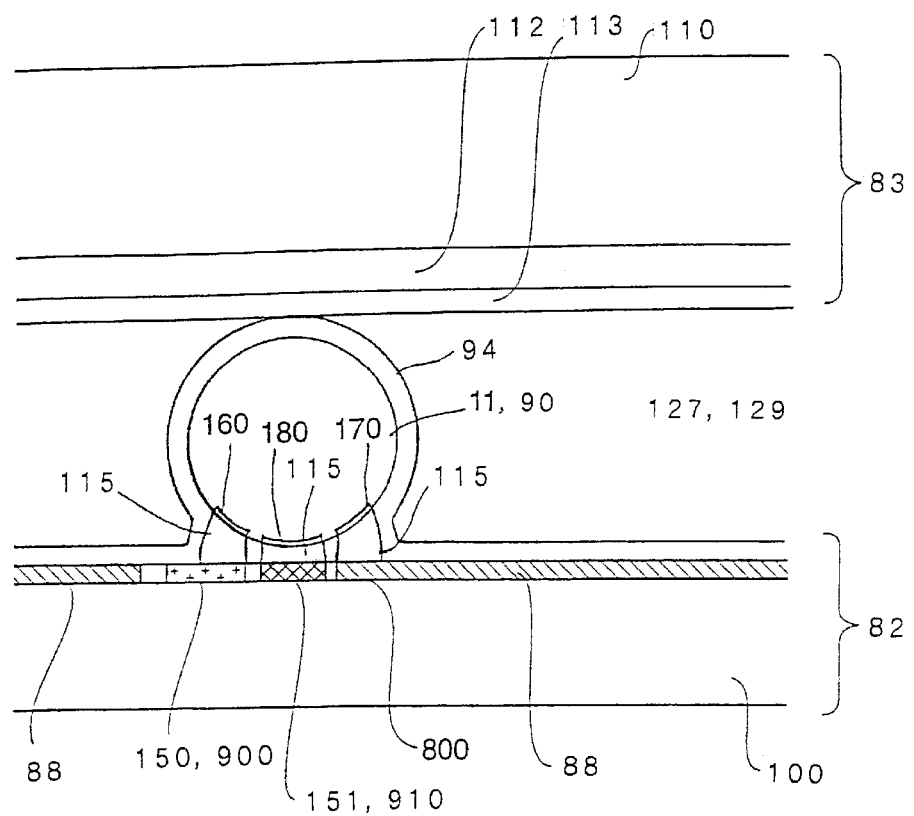

[FIG.9]
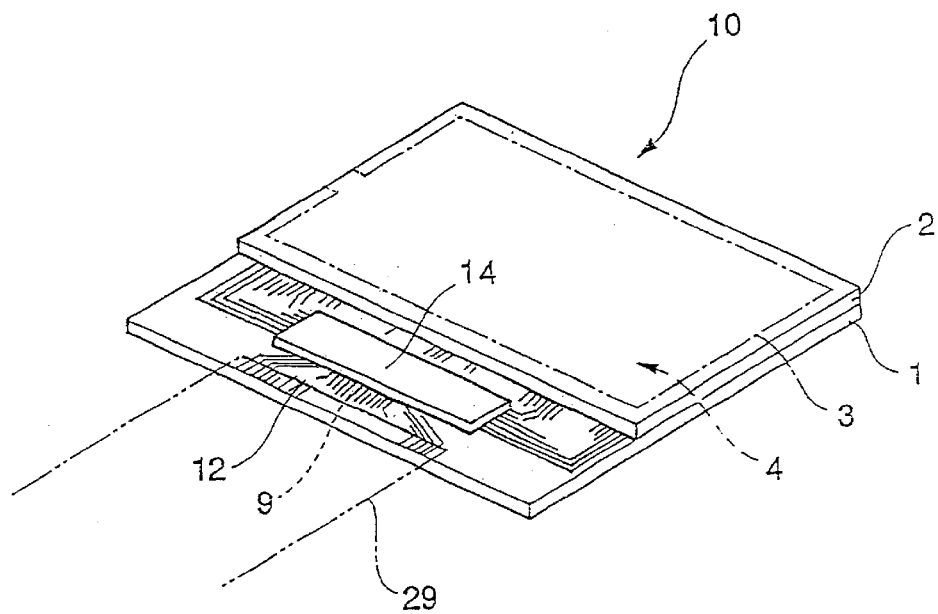

[FIG. 10]
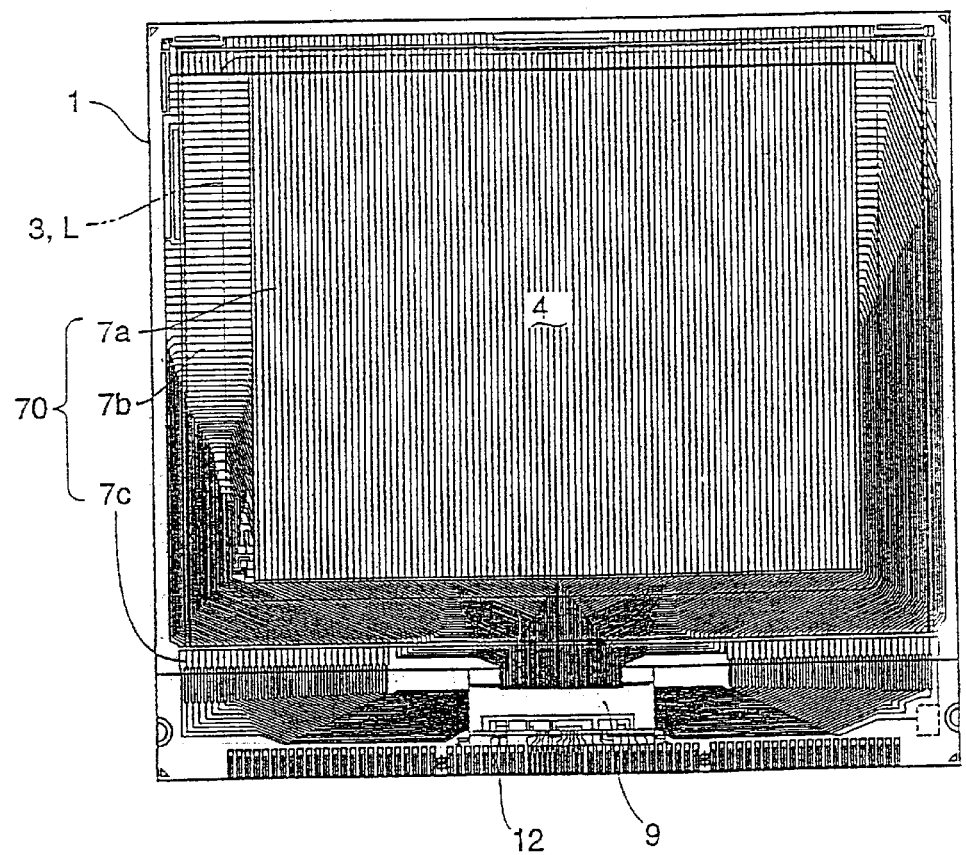

[FIG. 11]
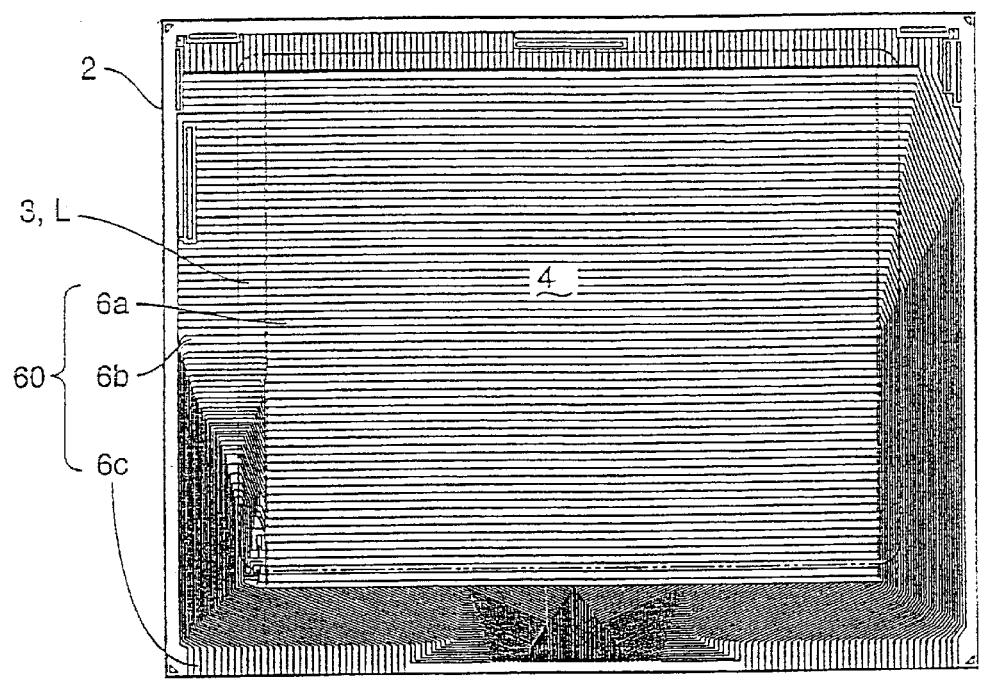

[FIG. 12]
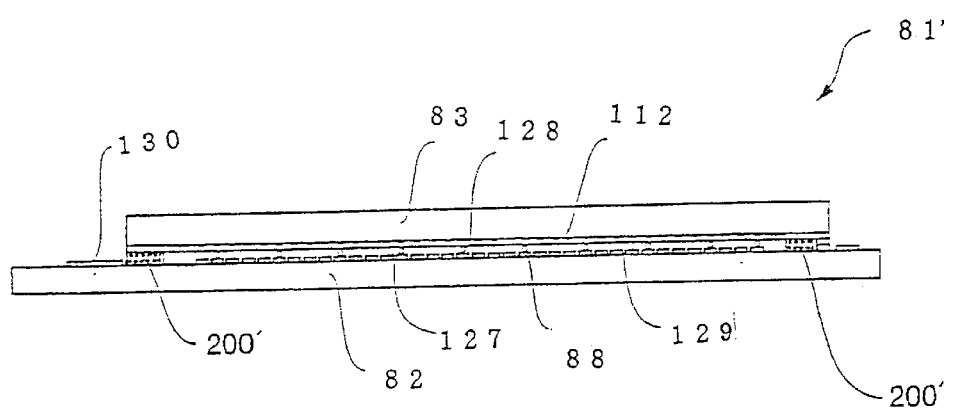

[FIG. 13]
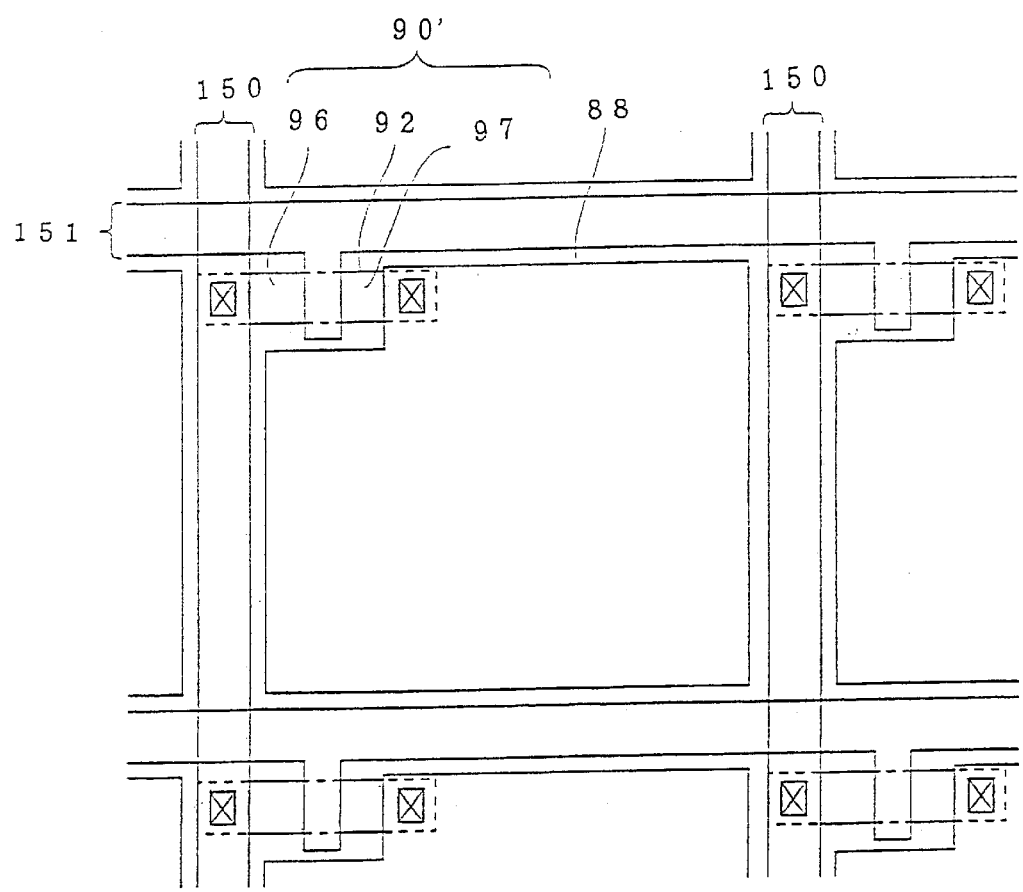

[FIG. 14]
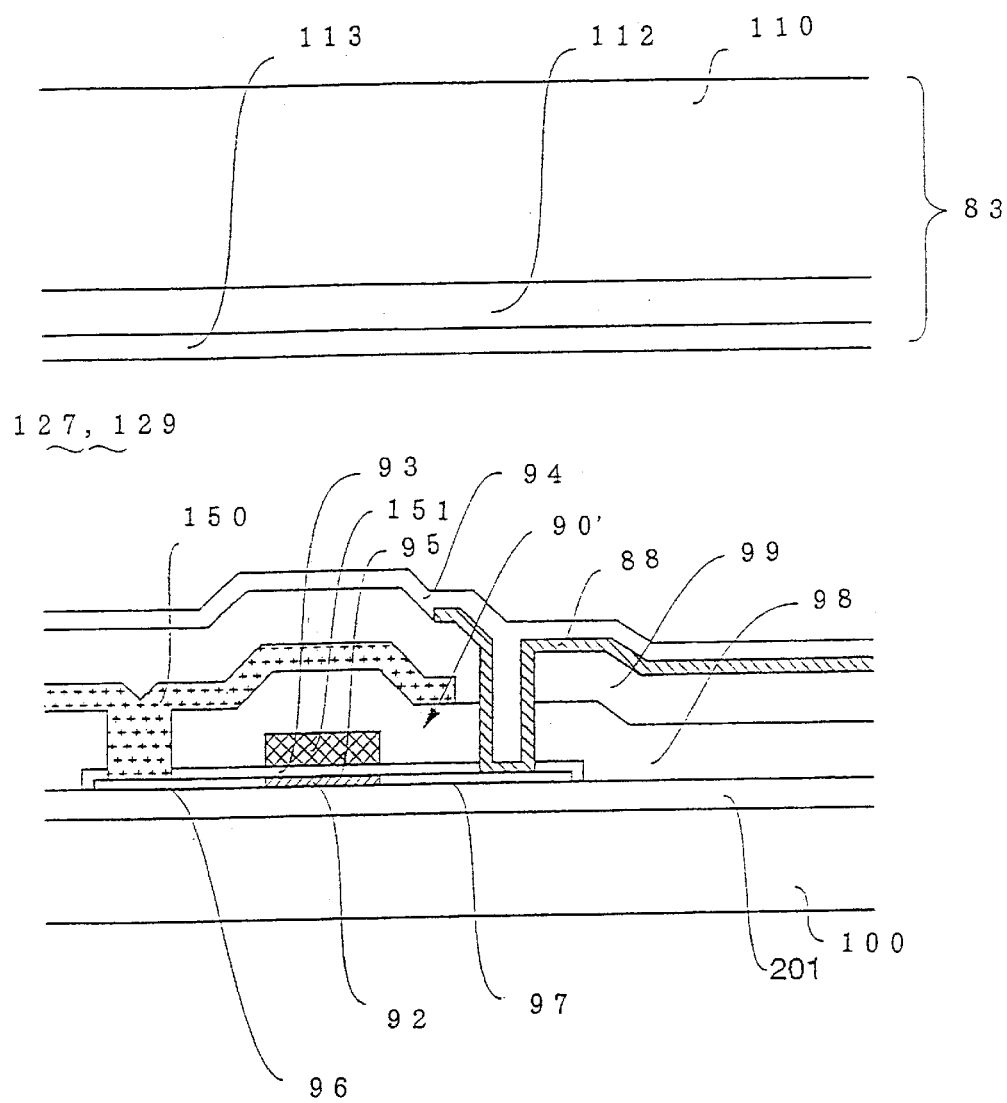

METHOD FOR MANUFACTURING AN ACTIVE MATRIX SUBSTRATE

BACKGROUND OF THE INVENTION

1. Industrial Field of the Invention

The present invention relates to an electro-optical device including an electro-optical material such as a liquid crystal disposed between electrodes, and particularly to a semiconductor device (hereinafter also referred to as an IC) used in an electro-optical device to drive an electro-optical material. More particularly, the present invention relates to a configuration of pixels in an active matrix electro-optical panel having an electro-optical material such as a liquid crystal disposed between a pair of substrates.

2. Description of the Related Art

There are various types of electro-optical devices designed to drive an electro-optical material between electrodes. One such device is a simple-matrix liquid crystal device which uses a liquid crystal as the electro-optical material and which includes, as shown in FIG. 9, a first substrate 1 made of transparent and alkali-free glass or the like and a second substrate 2 also made of transparent and alkali-free glass or the like wherein transparent electrodes are formed on the opposing surfaces of the respective substrates. Upon one of the substrates, there is disposed a sealing member 3 formed of a photo-setting resin or a thermosetting resin containing spacer elements by means of a printing technique or the like. The first substrate 1 and the second substrate 2 are adhesively bonded to each other via the sealing member 3 such that they are spaced a predetermined distance apart from each other. A liquid crystal is disposed and sealed in a sealing region 4 which is partitioned, by the sealing member 2, within the gap between the first substrate 1 and the second substrate 2.

In this liquid crystal device, the first substrate 1 is greater in size than the second substrate 2, and thus the first substrate 1, on which the second substrate 2 is disposed, extends outward from the lower surface of the second substrate 2 beyond an edge of the second substrate 2. On the extending part of the first substrate 1, an IC mounting area 9 is formed adjacent to the sealing region 4, and a driving IC 14 is disposed in the IC mounting area 9 by means of a COG (chip on glass) technique. In an area adjacent to the IC mounting area 9 on the extending part, a plurality of input terminals 12 are formed along an edge of the first substrate 1, and a flexible board 29 is connected to these input terminals 12.

FIGS. 10 and 11 are plan views illustrating the layout patterns of transparent electrodes formed on the first substrate 1 and the second substrate 2, respectively, of the liquid crystal device shown in FIG. 9.

Referring to FIG. 10, an electrode pattern 70 formed on the inner surface of the first substrate 1 includes a plurality of stripe-shaped electrodes (first electrodes) 7a extending in a vertical direction within the sealing region 4 partitioned by the sealing member 3 (in an area denoted by an alternate long and short dash line L), and also includes wiring lines 7b formed outside the sealing region 4 so as to electrically connect the stripe-shaped electrodes 7a to the IC mounting area 9. The electrode pattern 70 is made of an ITO (indium tin oxide) film or the like.

In FIG. 11, an electrode pattern 60 formed on the inner surface of the second substrate 2 includes a plurality of stripe-shaped electrodes (second electrodes) 6a extending in a horizontal direction within the sealing region 4 partitioned by the sealing member 3 (in the area denoted by the alternate long and short dash line L), and also includes wirings 6b formed outside the sealing region 4 so as to electrically connect the stripe-shaped electrodes 6a to the respective terminals. The electrode pattern 60 is also made of an ITO (indium tin oxide) film or the like.

The first substrate 1 and the second substrate 2 constructed in the above-described manner are adhesively bonded to each other such that the stripe-shaped electrodes 7a of the first substrate 1 and the stripe-shaped electrodes 6a of the second substrate 2 cross one another thereby forming a plurality of pixels at respective intersections in the form of a matrix. An alignment film (not shown) is formed over the entire surface of each substrate 1 and 2.

In the state in which the first and second substrates 1 and 2 are adhesively bonded to each other, the terminals 7c of the first substrate 1 and the terminals 6c of the second substrate, shown in FIGS. 10 and 11, oppose one another. Therefore, if the sealing member 3 used to adhesively bonding the inner surface of the first substrate 1 to the inners surface of the second substrate 2 includes electrically conductive particles, the respective terminals 7c of the first substrate 1 are conducted to the corresponding terminals 6c of the second substrate 2 via the electrically conductive particles contained in the sealing member 3. Thus, if a signal and electric power are supplied to the driving IC 14 via the flexible wiring board 29, the driving IC 14 applies a voltage to a selected stripe-shaped electrode 6a and a selected stripe-shaped electrode 7a thereby controlling the alignment of the liquid crystal of a corresponding pixel (at the intersection of the stripe-shaped electrodes 6a and 7a). As a result, a corresponding image is displayed on the liquid crystal device 10.

FIG. 12 illustrates another example of an electro-optical panel. In this electro-optical panel, an active matrix substrate (first substrate) 82 is formed by disposing pixels in a matrix fashion on the surface of a transparent substrate made of quartz glass or the like wherein each pixel includes a pixel electrode 88 and a thin film transistor (hereinafter referred to as a TFT) serving as a pixel switching device which will be described in detail later. An opposite substrate 83 (second substrate) is disposed opposite the active matrix substrate 82, wherein the opposite substrate 83 is formed by disposing opposite electrodes 112 on the surface of a substrate made of glass having high heat resistance such as Neoceram. An electro-optical material 129 such as a liquid crystal is placed and sealed between the two substrates described above. The active matrix substrate 82 and the opposite substrate 83 are adhesively bonded to each other via a sealing material 200' containing spacer elements such that they are spaced a determined distance apart from each other. An electro-optical material sealing region 127 is formed in the gap between the two substrates by partitioning the gap with the sealing member 200', and the electro-optical material 129 is disposed in the electro-optical material sealing region 127. The sealing member 200' containing spacer elements may be formed of an adhesive component such as an epoxy resin or an acrylic resin in which spacer elements such as glass beads are dispersed. Before adhesively bonding the active matrix substrate 82 and the opposite substrate 83 to each other, spacers 128 in the form of beads or fibers are placed in a dispersive fashion on the active matrix substrate 82 or the opposite substrate 83 so that the gap distance between the active matrix substrate 82 and the opposite substrate 83 bonded to each other is determined by the spacers 128.

In the electro-optical panel 81f described above, a TFT (pixel switching device) is formed in each pixel as shown in FIGS. 13 and 14. In FIGS. 13 and 14, an underlying protective film 201 which is electrically insulating is formed on the surface of a transparent substrate 100 serving as a base element of the active matrix substrate 82, and a silicon film 92 is formed in the shape of an island on the surface of the underlying protective film 201. A gate insulating film 93 is formed on the surface of the silicon film 92, and a scanning line 151 extends across the surface of the gate insulating film 93 so that the scanning line 151 acts as a gate electrode. A region of the silicon film 92, at a location opposing the scanning line 151 via the gate insulating film 93, serves as a channel region 95. A source region 96 is formed at one end of the channel region 95, and a drain region 97 is formed at the other end. A first interlayer insulating film 98 and a second interlayer insulating film 99 are formed on the surface of the TFT 90' serving as the pixel switching device. A data line 150 is formed on the surface of the first interlayer insulating film 98 wherein the data line 150 is electrically connected to the source region 96 via a contact hole formed in the first interlayer insulating film 98. The pixel electrode 88 is electrically connected to the drain region 97 via contact holes formed in the first and second interlayer insulating films 98 and 99.

Furthermore, an alignment film 94 is formed on the surface of the pixel electrode 88 as shown in FIG. 14. On the opposite substrate 83, opposite electrodes 112 are formed on a transparent substrate 110 serving as a base element of the opposite substrate 83, and an alignment film 113 is formed on the surface of the opposite electrodes 112.

In some cases, although not shown in the figures, a scanning line driving circuit for outputting a scanning signal via the scanning lines 151 and a data line driving circuit for outputting a data signal via the data lines 150 are formed on the active matrix substrate 82. In this case, the scanning line driving circuit and the data line driving circuit may be formed using TFTs having a similar structure to that of the TFT 90' serving as the pixel switching device.

In the liquid crystal device 10 shown in FIG. 9, if the size of an area where an image is displayed (an image display area in which pixels are disposed in the form of a matrix) is fixed, it is desirable that a peripheral area outside the image display area be small as possible. However, in the conventional liquid crystal device 10, a rather large peripheral area is required to dispose the driving IC 14, and thus the reduction in the area which does not make a direct contribution to displaying an image has a practical limitation.

In the electro-optical panel 81' shown in FIG. 12, it is desirable that an inexpensive glass substrate be employed as the transparent substrate 100 used in the active matrix substrate 82. It is also preferable to employ a plastic film as the transparent substrate 100. However, in order to employ such a transparent substrate, it is required that TFTs 90' serving as pixel switching devices and those in the driving circuit be formed at a temperature which is low enough to prevent the substrate from being thermally deformed or degraded. The temperature restriction results in various problems such as low transistor performance of the TFTs which cannot be overcome by the conventional technique of the electro-optical panel 81'.

SUMMARY OF THE INVENTION

In view of the above, it is a first object of the present invention to provide an electro-optical device whose peripheral area making no direct contribution to displaying an image is minimized in size by using a novel type of semiconductor device which is not known in the art.

It is a second object of the present invention to provide an electro-optical panel in which each pixel including a pixel electrode and a pixel switching device is formed in a novel structure without encountering a problem caused by heat resistance of a substrate when forming the switching device.

It is a third object of the present invention to provide an electro-optical panel in which the structure of each pixel is improved thereby allowing the gap distance between two substrates, between which an electro-optical material is disposed, to be precisely controlled thereby allowing an improvement in image quality.

According to a first aspect of the present invention, to achieve the above objects, there is provided an electro-optical device including an electro-optical material disposed between first and second electrodes and also including a substrate on which at least either the first or second electrode is formed and on which a plurality of input terminals for inputting a signal from the outside are formed and furthermore on which a semiconductor device for driving said electro-optical material via the first and second electrodes is mounted on an wiring pattern electrically connected to the input terminals, the electro-optical device being characterized in that the semiconductor device includes a plurality of spherical-shaped semiconductor devices each including a semiconductor device element formed on the surface of a spherical-shaped semiconductor material.

The present invention uses a novel type of IC based on the spherical-shaped semiconductor technology developed by Ball Semiconductor, Inc., and disclosed, for example, in "Nikkei Microdevices" published Jul. 1, 1998. According to this technology, a spherical semiconductor device is produced by first crystallizing, into a single crystal, a polycrystalline semiconductor material in the form of a spherical particle with a diameter less than 1 mm and then forming a semiconductor device using various semiconductor processes. A feature of the spherical semiconductor device is a high area-to-volume ratio compared to that of a wafer-shaped semiconductor substrate. This feature allows a large surface area to be obtained using a small amount of semiconductor material. This means that an IC having the same capabilities can be realized on a chip with a smaller size. If each semiconductor device is formed in a spherical shape, a plurality of semiconductor devices may be disposed in a dispersive fashion at various available locations. This makes it possible to minimize an area (peripheral area) of the electro-optical device which makes no direct contribution to displaying an image.

In this electro-optical device according to the present invention, the first electrode may be formed on a first substrate and the second electrode may be formed on a second substrate. Furthermore, a liquid crystal may be employed as the electro-optical material.

In the electro-optical device according to the present invention, one or more spherical-shaped semiconductor devices may be mounted in correspondence to each input terminal, without causing large areas to be occupied by the spherical-shaped semiconductor devices because they are small in size.

Alternatively, one or more spherical-shaped semiconductor devices may be mounted in correspondence to a plurality of input terminals. This allows the area which makes no direct contribution to displaying an image to be further reduced.

According to a second aspect of the present invention, there is provided an electro-optical device comprising a first substrate on which pixels are disposed in the form of a matrix, each pixel including a pixel electrode and a pixel switching device for controlling the supply of an image signal to the pixel electrode; a second substrate disposed opposite the first substrate; and an electro-optical material disposed between the first substrate and the second substrate, wherein each pixel switching device is formed on the surface of a spherical-shaped semiconductor material, and spherical-shaped semiconductor devices each including a pixel switching device formed on the surface of a spherical-shaped semiconductor material are disposed in the respective pixels on the first substrate.

In this technique, because pixel switching devices are first produced in the form of spherical-shaped semiconductor devices and then the spherical-shaped semiconductor devices are mounted on the first substrate, the switching devices can be produced using a high-temperature process or the like at an optimum temperature without encountering a limitation in temperature caused by the heat resistance of the substrate. This allows the switching devices to have high transistor performance. Furthermore, because the substrate is not exposed to high temperature when the switching devices are formed, an inexpensive substrate such as a glass substrate or a plastic film may be employed as the substrate. Another advantage is that the spherical-shaped semiconductor has a greater area-to-volume ratio than wafer-shaped semiconductor substrates. Therefore, a large surface area can be obtained using a small amount of semiconductor material, and thus the spherical-shaped semiconductor devices can be disposed in the respective pixels without causing a reduction in the aperture ratio (the ratio of the area which allows light to be passed therethrough and which thus makes a direct contribution to displaying an image to the total area).

In the above-described electro-optical device according to the present invention, the second substrate may include opposite electrodes disposed opposite to the pixel electrodes. Furthermore, a liquid crystal is used as the electro-optical material. In any case, the advantages described above can also be obtained.

Furthermore, in the above-described electro-optical device according to the present invention, the spherical-shaped semiconductor devices may be located between the first substrate and the second substrate so that the spherical-shaped semiconductors serve as spacers which determine the gap distance between the first substrate and the second substrates. If the second substrate is adhesively bonded to the first substrate after mounting the spherical-shaped semiconductor devices on the first substrate, the spherical-shaped semiconductor devices produce a particular gap between the first substrate and the second substrate. Herein, because the spherical-shaped semiconductor devices are placed in the respective pixels at uniform intervals rather than at random intervals, the gap distance between the first substrate and the second substrate is precisely determined. As a result, the thickness of the electro-optical material such as a liquid crystal sealed between the first substrate and the second substrate becomes uniform and thus it becomes possible to control the alignment of the electro-optical material more precisely. Thus, the electro-optical panel according to the present invention can display an image with high quality.

In the present invention, each pixel switching device may be a MIS (metal-insulator-semiconductor) transistor whose gate, source, and drain are connected to a scanning line, a data line, and a pixel electrode, respectively, formed on the first substrate. Furthermore, in the present invention, a scanning line driving circuit for outputting a scanning signal via the scanning line and a data line driving circuit for outputting a data signal via the data line may be formed on the first substrate. In this case, the data line driving circuit and the scanning line driving circuit may be formed of spherical-shaped semiconductor devices including transistors formed on the surface of spherical-shaped semiconductor materials.

BRIEF DESCRIPTION OF THE DRAWINGS

FIG. 1 is a schematic diagram illustrating a spherical-shaped semiconductor device employed in a liquid crystal device according to the present invention.

FIGS. 2(A), 2(B), and 2(C) are schematic diagrams illustrating spherical-shaped semiconductor devices shown in FIG. 1 mounted on substrates.

FIG. 3 is a perspective view illustrating the outer appearance of a simple-matrix liquid crystal device according to the present invention.

FIG. 4 is a plan view of an electro-optical panel according to the present invention, seen from the side of its opposite substrate.

FIG. 5 is a cross-sectional view of the electro-optical panel taken along line H–H' of FIG. 4.

FIG. 6 is a block diagram illustrating the configuration of the electro-optical panel shown in FIG. 4.

FIG. 7(A) is a plan view illustrating, in an enlarged fashion, some pixels of the electro-optical panel shown in FIG. 4, and FIG. 7(B) is a schematic diagram illustrating a spherical-shaped semiconductor device disposed in a pixel.

FIG. 8 is a cross-sectional view of a spherical-shaped semiconductor device mounted in the manner as shown in FIG. 7(A).

FIG. 9 is a perspective view illustrating the outer appearance of a simple matrix liquid crystal device according to a conventional technique.

FIG. 10 is a plan view illustrating a layout pattern of transparent electrodes formed on a first substrate of the liquid crystal device shown in FIG. 9.

FIG. 11 is a plan view illustrating a layout pattern of transparent electrodes formed on a second substrate of the liquid crystal device shown in FIG. 9.

FIG. 12 is a cross-sectional view of a conventional electro-optical panel.

FIG. 13 is a plan view illustrating, in an enlarged fashion, some pixels of the electro-optical panel shown in FIG. 12.

FIG. 14 is a cross-sectional view of one of the pixels shown in FIG. 13.

DESCRIPTION OF THE PREFERRED EMBODIMENTS

A first embodiment of an electro-optical device according to the present invention is described below with reference to the accompanying drawings. Before describing the electro-optical device, a spherical-shaped semiconductor device used in the present embodiment is described.

FIG. 1 is a schematic diagram illustrating a spherical-shaped semiconductor device employed in the present invention. FIGS. 2(A), 2(B), and 2(C) are schematic diagrams illustrating spherical-shaped semiconductor devices mounted on substrates.

In FIG. 1, a spherical-shaped semiconductor device 11 is produced by forming a semiconductor device element on the surface of a spherical-shaped semiconductor material (silicon). The advantage of the spherical-shaped semiconductor device is its high area-to-volume ratio which allows a large surface area to be obtained using a small amount of semiconductor material. The semiconductor material used herein may be obtained by melting a polycrystalline semiconductor material in the form of a particle with a diameter of the order of 1 mm in an argon ambient at a temperature in the range from 1000 to 10000 using an inductively coupled plasma thereby crystallize the polycrystalline semiconductor material into the form of a single crystal.

Various types of semiconductor device elements such as active device elements and memory device elements may be formed on the surface of a spherical-shaped semiconductor material by means of an exposure method such as that shown in FIG. 1. In this exposure method, light is passed through a mask and then reflected by mirrors 311, 321, and 331 disposed around a spherical-shaped semiconductor material onto the spherical-shaped semiconductor material thereby exposing a desired surface area of the spherical-shaped semiconductor material. An etching process and a film forming process may be performed by transporting the spherical-shaped semiconductor material through a pipe through which an etching gas or a source gas is supplied.

As shown in FIG. 2(A), a single spherical-shaped semiconductor device 11 produced by forming various semiconductor device elements on the spherical-shaped semiconductor material in the above-described manner may be mounted on an wiring pattern 19 formed on a substrate 1, which will be described later, or a plurality of spherical-shaped semiconductor devices 11 may be integrated on the substrate 1. In the example shown in FIG. 2(A), three spherical-shaped semiconductor devices 11 are electrically connected to the substrate 1 wherein two of the spherical-shaped semiconductor devices 11 are electrically connected to each other. In the example shown in FIG. 2(B), a plurality of spherical-shaped semiconductor devices 11 are placed in a plurality of layers so as to form an IC or a complicated circuit. In the example shown in FIG. 2(C), one spherical-shaped semiconductor device 11 is separately mounted on a transparent substrate 100, 110, and two spherical-shaped semiconductor devices 11 are mounted on the transparent substrate 100, 110 and electrically connected to each other.

In each case, the connections of the spherical-shaped semiconductor devices to the substrate 1 or the transparent substrate 100 or 110, and the connections among the spherical-shaped semiconductor devices 11 may be performed using a solder layer formed on the surface of the electrodes 111 or on the surface of the wiring pattern 19. Instead of the solder 12, an electrically conductive adhesive may also be employed.

As an example of an electro-optical device according to the present invention, a liquid crystal device in which a liquid crystal is used as the electro-optical material is described below.

FIG. 3 is a perspective view of the liquid crystal device according to the present invention. In the present embodiment, as shown in FIG. 3, the liquid crystal device 10 is of the simple matrix type which may be installed on an electronic device such as a portable telephone device. This simple matrix liquid crystal device includes a first substrate 1 made of transparent and alkali-free glass or the like and a second substrate 2 also made of transparent and alkali-free glass or the like wherein the substrates 1 and 2 are disposed such that they oppose each other. Upon one of the substrates, there is disposed a sealing member 3 formed of a photo-setting resin or a thermosetting resin containing spacer elements by means of a printing technique or the like. The first substrate 1 and the second substrate 2 are adhesively bonded to each other via the sealing member 3 such that they are spaced a predetermined distance apart from each other. A liquid crystal is disposed and sealed in a sealing region 4 which is partitioned, by the sealing member 3, within the gap between the first substrate 1 and the second substrate 2. The sealing of the liquid crystal may be performed as follows. First, the sealing member 3 is formed in such a manner that it has a partially removed part serving as a liquid crystal injection hole 30. A liquid crystal is injected into the sealing region 4 via the liquid crystal injection hole 30 by means of a low pressure injection technique or the like. After injecting the liquid crystal, the liquid crystal injection hole 30 is filled with a sealing agent (not shown).

Also in the present embodiment, electrode patterns similar to those described above with reference to FIGS. 10 and 11 are formed on the first and second substrates 1 and 2, respectively. Thus, in the following description of the electrode patterns formed on the first and second substrates 1 and 2 of the liquid crystal device 10 of the present embodiment, FIGS. 10 and 11 will be referred to. Referring to FIG. 10, an electrode pattern 70 formed on the inner surface of the first substrate 1 includes a plurality of stripe-shaped electrodes (first electrodes) 7a extending in a vertical direction within the sealing region 4 partitioned by the sealing member 3 (in an area denoted by an alternate long and short dash line L), and also includes wirings 7b formed outside the sealing region 4 so as to electrically connect the stripe-shaped electrodes 7a to the IC mounting area 9. On the other hand, an electrode pattern 60 formed on the inner surface of the second substrate 2 includes, as shown in FIG. 11, a plurality of stripe-shaped electrodes (second electrodes) 6a extending in a horizontal direction within the sealing region 4 partitioned by the sealing member 3 (in the area denoted by the alternate long and short dash line L), and also includes wiring lines 6b formed outside the sealing region 4 so as to electrically connect the stripe-shaped electrodes 6a to the respective terminals. When the first substrate 1 and the second substrate 2 constructed in the above-described manner are adhesively bonded to each other as shown in FIG. 3, the stripe-shaped electrodes 7a of the first substrate 1 and the stripe-shaped electrodes 6a, of the second substrate 2 cross one another, and a plurality of pixels are formed at respective intersections in the form of a matrix. In the state in which the first and second substrates 1 and 2 are adhesively bonded to each other, the terminals 7c of the first substrate 1 and the terminals 6c of the second substrate 2, shown in FIGS. 10 and 11, oppose one another. Therefore, if the sealing member 3 used to adhesively bonding the inner surface of the first substrate 1 to the inners surface of the second substrate 2 includes electrically conductive particles, the respective terminals 7c of the first substrate 1 are electrically connected to the corresponding terminals 6c of the second substrate 2 via the electrically conductive particles contained in the sealing member 3.

The electrically conductive particles contained in the sealing member 3 are preferably plastic beads which are elastically deformable and whose surface is plated. The size of the electrically conductive particles is selected to be slightly greater than the size of the spacer elements contained in the sealing member 3. After placing the first and second substrate 1 and 2 one on another, if the sealing member 3 is fused and cured while pressing the first and second substrates 1 and 2 against each other, the electrically conductive particles are compressively deformed between the first and second substrates 1 and 2 and thus the terminals 7c of the first substrate 1 and the corresponding terminals 6c of the second substrate 2 are conducted to each other.

In the liquid crystal device 10 of the present embodiment constructed in the above-described manner, the first substrate 1 has no particular wide area for installing an IC, as can be seen from FIG. 3. Instead, a plurality of spherical-shaped semiconductor devices 11 described earlier with reference to FIGS. 1 and 2 are separately mounted on the wiring pattern 19 extending from the plurality of input terminals 12 toward the sealing region 4. In correspondence with one input terminal 12, one or more spherical-shaped semiconductor devices 11 are mounted. Some spherical-shaped semiconductor devices 11 may be electrically connected to each other as shown in FIG. 2(A). Spherical-shaped semiconductor devices 11 may also be mounted in a plurality of layers as shown in FIG. 2(B), as required.

Thus, if a signal and electric power are supplied to the input terminals 12 via the flexible board 29, the respective spherical-shaped semiconductor devices 11 apply a predetermined voltages to selected stripe-shaped electrodes 6a and 7a thereby applying particular electric fields to the liquid crystal disposed between the stripe-shaped electrodes 6a and 7a, in the respective pixels (at intersections of the stripe-shaped electrodes 6a and 7a). More specifically, for example, image data is applied to the stripe-shaped electrodes 7a, and a scanning signal is applied to the stripe-shaped electrodes 6a thereby controlling the alignment of the liquid crystal of the respective pixels (at intersections of the stripe-shaped electrodes 6a and 7a). As a result, a corresponding image is displayed on the liquid crystal device 10.

In the present embodiment, as described above, the functions of driving the liquid crystal disposed between the stripe-shaped electrodes 6a and 7a in accordance with the signal input via the flexible board 29 are realized by the plurality of spherical-shaped semiconductor devices 11 each including semiconductor device elements formed on spherical-shaped semiconductor materials having a large area-to-volume ratio compared with that of conventional wafer-shaped semiconductor substrate since the spherical-shaped semiconductor devices 11 function as the IC mounted on the first substrate 1 which extends from the second substrate 2. Because the size of each spherical-shaped semiconductor device is rather small, the number of device elements formed thereon is limited to a rather small value. However, the advantage of spherical-shaped semiconductor devices is in that they may be mounted at various locations in a dispersive fashion without needing large mounting areas, as opposed to conventional ICs which need large mounting areas. Therefore, a slight extension of the first substrate 1 beyond an edge of the second substrate 2 is sufficient for the purpose in the present embodiment. Thus, in the liquid crystal device 10, the area (peripheral area) which makes no direct contribution to displaying an image can be reduced. This makes is possible to realize a liquid crystal device 10 having a large display area relative to the total size.

In the above embodiment, one or more spherical-shaped semiconductor devices 11 are mounted in corresponding to one input terminal 12. Alternatively, one or more spherical-shaped semiconductor devices 11 may be mounted in correspondence with a plurality of input terminals 12. This makes it possible to further reduce the area (peripheral area) which makes no direct contribution to displaying an image.

Although in the above embodiment a liquid crystal device is taken as an example of the electro-optical device, the present invention may also be applied to various types of electro-optical devices other than the liquid crystal device. For example, the invention may be applied to an electroluminescent (EL) device using a luminescent polymer, a plasma display device (PDP), and a field emission device (FED).

Although the present invention has been described above with reference to a specific embodiment, the invention is not limited to such an embodiment. Various modifications are possible without departing from the scope of the invention as defined in Claims.

An electro-optical device according to a second embodiment of the present invention is described below.

FIG. 4 is a plan view of an active matrix electro-optical panel according to the present embodiment, seen from the side of its opposite substrate. FIG. 5 is a cross-sectional view of the electro-optical panel taken along line H–H' of FIG. 4.

As shown in FIGS. 4 and 5, the electro-optical panel 81 of the present embodiment includes: an active matrix substrate 82 (first substrate) including an array of pixels formed on the surface of a transparent substrate 100, each pixel including a transparent pixel electrode 88 and a MIS transistor serving as a pixel switching device which will be descried later; an opposite substrate 83 (second substrate) which includes transparent opposite electrodes 112 formed on the surface of a transparent substrate 110 and which is disposed opposite the active matrix substrate 82; and an electro-optical material 129 such as a liquid crystal disposed and sealed between the above two substrates.

The active matrix substrate 82 and the opposite substrate 83 are adhesively bonded to each other via a sealing member 200 formed along the periphery of the opposite substrate 83 such that they are spaced a predetermined distance apart from each other. An electro-optical material sealing region 127 is formed in the gap between the active matrix substrate 82 and the opposite substrate 83 by partitioning the gap with the sealing member 200, and the electro-optical material 129 such as a liquid crystal is sealed in the electro-optical material sealing region 127.

In the present embodiment, as will be described in further detail later, the gap distance (cell thickness) between the active matrix substrate 82 and the opposite substrate 83 is determined by the spherical-shaped semiconductor devices 11 disposed between the active matrix substrate 82 and the opposite substrate 83. Therefore, in the present embodiment, unlike the conventional electro-optical panel, the sealing member 200 is not necessarily required to contain additional spacer elements, although the sealing member 200 may include spacer elements. Furthermore, in the present embodiment, no additional spacers are dispersed on either the active matrix substrate 82 or the opposite substrate 83.

In the electro-optical panel 81, the opposite substrate 83 is smaller than the active matrix substrate 82. Therefore, when the active matrix substrate 82 and the opposite substrate 83 are adhesively bonded to each other, a peripheral part of the active matrix substrate 82 extends outward beyond an edge of the opposite substrate 83. As a result, driving circuits (the scanning line driving circuit 140 and the data line driving circuit 130) and input/output terminals 125 on the active matrix substrate 82 are exposed without being covered by the opposite substrate 83. Thus, this allows the flexible wiring board 159 to be connected to the input/output terminals 125. The sealing member 200 has a partially removed part serving as an electro-optical material injection hole 241. If the region enclosed by the sealing member 200 is pumped to a low pressure after the opposite substrate 83 and the active matrix substrate 82 are adhesively bonded to each other, an electro-optical material 129 can be injected therein via the electro-optical material injection hole 241. After injecting the electro-optical material 129, the electro-optical material injection hole 241 is filled with a sealing agent 242. On the opposite substrate 83, there is disposed a light blocking film 55 which defines an image display area 87 in the region surrounded by the sealing member 200. Furthermore, a light blocking film 86 is formed on the opposite substrate 83 over areas corresponding to boundary areas between adjacent pixel electrodes 88 formed on the active matrix substrate 82.

In the present embodiment, the electro-optical panel 81 has no color filter. However, if it is desired to produce a color display device, an RGB color filter with a protective film may be formed on the opposite substrate 83, in proper areas corresponding to the respective pixel electrodes 88. A polarization film, a retardation film, or a polarizer is disposed on the light incidence surface or the light emerging surface of the opposite substrate 83 or the active matrix substrate 82 depending on the type of the electro-optical material 129, that is, depending on the operation mode such as a TN (twisted nematic) mode, an STN (super TN) mode, or normally white mode/normally black mode.

In the electro-optical panel 81 constructed in the above-described manner, the active matrix substrate 82 handles the scanning signal and data signal. Furthermore, it is also required to supply a proper potential to the opposite electrodes 112. To this end, the electro-optical panel 81 has first electrodes 126 for intersubstrate conduction are formed using aluminum film (light blocking material) or the like on the surface of the active matrix substrate 82 during some processing step such as a data line formation step such that the first electrodes 126 are disposed at locations corresponding to the respective corners of the opposite substrate 83. On the other hand, second electrodes 128 for intersubstrate conduction are formed on the opposite substrate 83 using an ITO film (optically transparent material) when the opposite substrate 83 produced so that the second electrodes 128 are located at the respective corners of the opposite substrate 83. The first electrodes 126 and the second electrodes 128 for interlayer conduction are conducted to each other via a conductive material 56 containing conductive particles such as a silver powder or gold-plated fibers dispersed in an epoxy resin adhesive or an acrylic resin adhesive. Thus, in this electro-optical device 1, it is not required to connect flexible wiring boards to both the active matrix substrate 82 and the opposite substrate 83. Instead, one flexible wiring board 159 is connected only to the active matrix substrate 82 thereby making it possible to supply signals to both the active matrix substrate 82 and the opposite substrate 83.

FIG. 6 is a block diagram illustrating the configuration of the electro-optical panel. FIG. 7(A) is a plan view illustrating some pixels of the electro-optical panel. FIG. 7(B) is a schematic diagram illustrating a spherical-shaped semiconductor device disposed in a pixel. FIG. 8 is a cross-sectional view of a pixel.

As shown in FIG. 6, each pixel of the electro-optical panel 81 includes a pixel switching device formed on the active matrix substrate 82, wherein each pixel switching device is connected to a data line 150 and a scanning line 151. A liquid crystal cell 154 is disposed between the active matrix substrate 82 and the opposite substrate 83, wherein an image signal is input to the liquid crystal 154 from the data line 150 via the pixel switching device. In the present embodiment, a MIS transistor 90 formed on a spherical-shaped semiconductor device 11 described earlier with reference to FIGS. 1 and 2 is employed as the pixel switching device as will be described in further detail later.

Each data line 150 is connected to a data line driving circuit 130 formed of a shift register 194, a level shifter 195, video lines 197, and analog switches 196. Each scanning line 151 is connected to a scanning line driving circuit 140 formed of a shift register 198 and a level shifter 199.

In the present embodiment, the data line driving circuit 130 and the scanning line driving circuit 140 are also constructed using MIS transistors 90 formed on spherical-shaped semiconductor devices 11 described earlier with reference to FIGS. 1 and 2.

On the active matrix substrate 82, as shown in FIG. 7(A), transparent pixel electrodes 88 are formed in a matrix fashion, and data lines 150 and scanning lines 151 are formed along the vertical and horizontal boundaries of pixel electrodes 88. In the present embodiment, a data line terminal 900 extends from one of date lines 150 into each pixel area partitioned by data lines 150 and scanning lines 151, and a scanning line terminal 910 extends from one of scanning lines 151 into each pixel area. Each pixel electrode 88 also has a pixel electrode terminal 800 extending in the corresponding pixel area.

In the present embodiment, one spherical-shaped semiconductor device 11 described earlier with reference to FIGS. 1 and 2 is installed in each pixel using the date line terminal 900, the scanning line terminal 910, and the pixel electrode terminal 800 disposed in the pixel area. That is, as shown in FIG. 7(B), in each spherical-shaped semiconductor device 11, a source region 96 and a drain region 97 both doped with an impurity are formed on the surface of a spherical-shaped silicon semiconductor material, wherein a region between the source and drain regions serves as a channel region 95. A gate electrode 98 is formed in a region opposing the channel region 95 via a gate insulating film (not shown). Furthermore, a gate terminal 180, a source terminal 160, and a drain terminal 170 are formed wherein they are connected to the gate electrode 98, the source region 96, and the drain region 97, respectively, via contact holes formed in an interlayer insulating film (not shown). Herein, the gate terminal 180, the source terminal 160, and the drain terminal 170 are formed so that they overlap the scanning line terminal 910, the data line terminal 900, and the pixel electrode terminal 800, respectively, when the spherical-shaped semiconductor device 11 is placed as shown in FIG. 7(A). If the spherical-shaped semiconductor devices 11 are mounted after forming an conductive element 115 such as solder or an conductive adhesive on either each of the gate terminal 180, the source terminal 160, and the drain terminal 170 or on each of the scanning line terminal 910, the data line terminal 900, and the pixel electrode terminal 800, then the gate terminal 180 (gate electrode 98) of each spherical-shaped semiconductor device 11 is electrically connected to a corresponding scanning line 151 via a corresponding scanning line terminal 910, the source terminal 160 (source region 96) is electrically connected to a corresponding data line 150 via a corresponding data line terminal 900, and the drain terminal 170 (drain region 97) is electrically connected to a corresponding pixel electrode 88 via a corresponding pixel electrode terminal 800.

After mounting spherical-shaped semiconductor devices 11 on the active matrix substrate 82, an alignment film 94 such as a polyimide film is formed thereon, as shown in FIG. 8. Similarly, on the opposite substrate 83, an alignment film 113 is formed on the opposite electrodes 112 formed on the surface of the transparent substrate 110.

In the active matrix substrate 82 of the electro-optical panel 81 of the present embodiment constructed in the above-described manner, the MIS transistors 90 turn on and off in response to scanning signals supplied via the scanning lines 150 so that an image signal is applied to the pixel electrodes 88 via the data lines 150 and via the pixel switching MIS transistors 90 thereby controlling the alignment of the electro-optical material 129 disposed between the pixel electrode 88 and the opposite electrodes 112 on a pixel-by-pixel basis and thus displaying an image corresponding to the image signal.

The electro-optical panel 81 having the above-described structure may be produced as follows. After producing active matrix substrates 82 and opposite substrates 83 on large-sized substrates, respectively, the large-sized substrates are adhesively bonded to each other via sealing members 200. The bonded substrates are then cut into individual electro-optical panels 81. For simplicity, it is assumed in the following description that a single active matrix substrate 82 and a single opposite substrate 83 are adhesively bonded to each other, and then an electro-optical material 129 such as a liquid crystal is injected into the gap between the substrates 82 and 83.

First, spherical-shaped semiconductor devices 11 described above with reference to FIG. 7(B) are produced by forming a MIS transistor 90 and associated terminals on the surface of each spherical-shaped semiconductor material according to the method described above with reference to FIG. 1.

On the other hand, the opposite substrate 83 is produced by forming the opposite electrodes 112, second electrodes 128 for intersubstrate conduction, the light blocking film 86, and the alignment film 113 on the transparent substrate 110 serving as the base element of the opposite substrate 83, using known semiconductor processes such as a photolithography process. After that, a rubbing process is performed upon the opposite substrate 83.

The active matrix substrate 82 is produced by forming various wirings including the scanning lines 151 and the data lines 150 and the pixel electrodes 88 on the surface of the transparent substrate 100 serving as the base element of the active matrix substrate 82 as shown in FIGS. 4, 5, 7(A), and 8, using known semiconductor processes such as a photolithography process. During the process of forming the scanning lines 151, the data lines 150, and the pixel electrodes 88, the first electrodes 126 for intersubstrate conduction, the scanning line terminals 910, the data line terminals 900, and the pixel electrode terminals 800 are also formed simultaneously.

The spherical-shaped semiconductor devices 11 are then mounted using the scanning line terminals 910, the data line terminals 900, and the pixel electrode terminals 800. The spherical-shaped semiconductor devices 11 including the MIS transistors 90 formed thereon are also disposed in predetermined regions in the manner as shown in FIGS. 2(B), 2(C), or 5, so as to form the data line driving circuit 130 and the scanning line driving circuit 140.

The alignment film 94 is then formed, using a polyimide resin or the like, on the spherical-shaped semiconductor devices 11 and the pixel electrodes 88. Thus, the active matrix substrate 82 is obtained. A rubbing process is then performed on the obtained active matrix substrate 82.

After coating the sealing material 200 and the conductive material 56 in a predetermined area of the active matrix substrate 82 or the opposite substrate 83, the active matrix substrate 82 and the opposite substrate 83 are adhesively bonded to each other so that the active matrix substrate 82 and the opposite substrate 83 are precisely spaced from each other by the spherical-shaped semiconductor devices 11 disposed between the active matrix substrate 82 and the opposite substrate 83 and so that the active matrix substrate 82 and the opposite substrate 83 are conducted to each other.

The electro-optical material 129 such as a liquid crystal is injected by means of a low pressure injection technique or the like into the electro-optical material sealing region 127 via the electro-optical material injection hole 241 formed by partially removing the sealing member 200. After injecting the electro-optical material 129, the electro-optical material injection hole 241 is filled with the sealing agent 242. Thus, the electro-optical panel 81 in the complete form is obtained.

In the electro-optical panel 81 of the present embodiment, as described above, because MIS transistors 90 (serving as pixel switching transistors or used to form the driving circuits) are first produced in the form of spherical-shaped semiconductor devices 11 and then the spherical-shaped semiconductor devices are mounted in the pixel areas or the driving circuit areas on the active matrix substrate 82, the MIS transistors 90 can be produced at an optimum temperature without encountering a limitation in temperature caused by the heat resistance of the substrate. This allows the MIS transistors 90 to have high transistor performance. Furthermore, because the substrate is not exposed to high temperature when the MIS transistors 90 are formed, an inexpensive substrate such as a glass substrate or a plastic film may be employed as the active matrix substrate 82. Another advantage is that the spherical-shaped semiconductor devices 11 have a greater area-to-volume ratio than wafer-shaped semiconductor substrates. Therefore, a large surface area can be obtained using a small amount of semiconductor material, and thus the spherical-shaped semiconductor devices 11 can be disposed in the respective pixels without causing a reduction in the aperture ratio (the ratio of the area which allows light to be passed therethrough and which thus makes a direct contribution to displaying an image to the total area).

The spherical-shaped semiconductor devices 11 disposed between the active matrix substrate 82 and the opposite substrate 83 serve as spacers which determine the gap distance between the active matrix substrate 82 and the opposite substrate 83. If the opposite substrate 83 is adhesively bonded to the active matrix substrate 82 after mounting the spherical-shaped semiconductor devices 11 on the active matrix substrate 82, the spherical-shaped semiconductor devices 11 produce a particular gap between the active matrix substrate 82 and the opposite substrate 83. Herein, because the spherical-shaped semiconductor devices 11 are placed in the respective pixels at uniform intervals rather than at random intervals, the gap distance between the first substrate and the second substrate is precisely determined. As a result, the thickness of the electro-optical material 129 such as a liquid crystal sealed between the active matrix substrate 82 and the opposite substrate 83 becomes uniform. Thus it becomes possible to display an image with high quality.

Although the embodiment of the present invention has been described above with reference to the active matrix liquid crystal display panel using the liquid crystal as the electro-optical material as an example of the active matrix electro-optical panel, the present invention may also be applied to other types of active matrix electro-optical panel. For example, the invention may be applied to an electroluminescent (EL) device using a luminescent polymer, a plasma display device (PDP), and a field emission device (FED).

As described above, the spherical-shaped semiconductor devices used in the electro-optical devices have a high area-to-volume ratio compared with wafer-shaped semiconductor substrates, because semiconductor device elements are formed on the surface of spherical-shaped semiconductor materials. Therefore, a large surface area can be obtained using a small amount of semiconductor material. Thus, by employing the spherical-shaped semiconductor devices to produce electro-optical devices, it becomes possible to minimize the area (peripheral area) of the electro-optical device which makes no direct contribution to displaying an image. Furthermore, in the electro-optical panel according to the present invention, because pixel switching devices are first produced in the form of spherical-shaped semiconductor devices and then the spherical-shaped semiconductor devices are mounted on the first substrate, the switching devices can be produced at an optimum temperature without encountering a limitation in temperature caused by the heat resistance of the substrate. This allows the switching devices to have high transistor performance. Furthermore, because the substrate is not exposed to high temperature when the switching devices are formed, an inexpensive substrate such as a glass substrate or a plastic film may be employed as the substrate. Another advantage is that the spherical-shaped semiconductor has a greater area-to-volume ratio than wafer-shaped semiconductor substrates. Therefore, a large surface area can be obtained using a small amount of semiconductor material, and thus the spherical-shaped semiconductor devices can be disposed in the respective pixels without causing a reduction in the aperture ratio (the ratio of the area which allows light to be passed therethrough and which thus makes a direct contribution to displaying an image to the total area). When the second substrate is adhesively bonded to the first substrate after mounting the spherical-shaped semiconductor devices on the first substrate, the spherical-shaped semiconductor devices produce a particular gap between the first substrate and the second substrate. Herein, because the spherical-shaped semiconductor devices are placed in the respective pixels at uniform intervals rather than at random intervals, the gap distance between the first substrate and the second substrate is precisely determined. As a result, the thickness of the electro-optical material such as a liquid crystal sealed between the first and second substrates becomes uniform. Thus it becomes possible to display an image with high quality.

What is claimed is:

1. A method for manufacturing an active matrix substrate including a pixel electrode, and a pixel switching transistor adapted to control a level of an image signal applied to the pixel electrode, the method comprising:
    forming the pixel electrode on a substrate;
    forming the pixel switching transistor on a material separated from the substrate, the pixel switching transistor including a source region, a drain region, and a gate electrode;
    disposing the pixel switching transistor on the substrate, after forming both the pixel electrode and the pixel switching transistor.

2. A method for manufacturing an active matrix substrate according to claim 1, further comprising forming a wiring on the substrate, wherein during the step of disposing the pixel switching transistor, one of the source region and the gate electrode is electrically connected to the wiring.

3. A method for manufacturing an electro-optical panel comprising the method of manufacturing the active matrix substrate according to claim 2.

4. A method for manufacturing an electro-optical panel comprising the method of manufacturing the active matrix substrate according to claim 1.

5. A method for manufacturing an active matrix substrate as set forth in claim 1, wherein the material separated from the substrate comprises a semiconductor material.

6. A method for manufacturing an active matrix substrate as set forth in claim 1, wherein the pixel switching transistor comprises a Metal Insulator Semiconductor (MIS) type transistor.

7. A method for manufacturing an active matrix substrate including a pixel electrode, and a pixel switching transistor adapted to control a level of an image signal applied to the pixel electrode, the method comprising:
    forming a data line on a substrate;
    forming the pixel switching transistor on a material separated from the substrate, the pixel switching transistor including a source region, a drain region, and a gate electrode;
    disposing the pixel switching transistor on the substrate and electrically connecting the source region to the data line, after forming both the data line and the pixel switching transistor.

8. A method for manufacturing an electro-optical panel comprising the method of manufacturing the active matrix substrate according to claim 7.

9. A method for manufacturing an active matrix substrate as set forth in claim 7, further comprising:
    forming a scanning line on the substrate; and
    mounting the pixel switching transistor including electrically connecting the gate electrode to the scanning line, after forming the scanning line.

10. A method for manufacturing an active matrix substrate as set forth in claim 7, further comprising:
    forming the pixel electrode on the substrate; and
    mounting the pixel switching transistor including electrically connecting the drain region to the pixel electrode, after the step of forming the pixel electrode.

11. A method for manufacturing an active matrix substrate as set forth in claim 7, further comprising:
    forming a scanning line and the pixel electrode on the substrate; and
    mountings the pixel switching transistor including electrically connecting the gate electrode to the scanning line and electrically connecting the drain region to the pixel electrode, after the steps of forming the scanning line and mounting the pixel electrode.

12. A method for manufacturing an active matrix substrate including a pixel electrode, and a pixel switching transistor adapted to control a level of an image signal applied to the pixel electrode, the method comprising:
    forming a scanning line on a substrate;
    forming the pixel switching transistor on a material separated from the substrate, the pixel switching transistor including a source region, a drain region, and a gate electrode;
    disposing the pixel switching transistor on the substrate and electrically connecting the gate electrode to the scanning line, after forming both the scanning line and the pixel switching transistor.

13. A method for manufacturing an electro-optical panel comprising the method of manufacturing the active matrix substrate according to claim 12.

14. A method for manufacturing an active matrix substrate as set forth in claim 12, further comprising:
    forming the pixel electrode on the substrate; and
    mounting the pixel switching transistor including electrically connecting the drain region to the pixel electrode, after the step of forming the pixel electrode.

15. A method for manufacturing an active matrix substrate including a pixel electrode, and a pixel switching transistor adapted to control a level of an image signal applied to the pixel electrode, the method comprising:

forming the pixel electrode on a substrate;

forming the pixel switching transistor on a material separated from the substrate, the pixel switching transistor including a source region, a drain region, and a gate electrode;

disposing the pixel switching transistor on the substrate and electrically connecting the drain region to the pixel electrode, after forming both the pixel electrode and the pixel switching transistor.

16. A method for manufacturing an electro-optical panel comprising the method of manufacturing the active matrix substrate according to claim 15.

17. A method for manufacturing an active matrix substrate including a pixel electrode, a pixel switching transistor adapted to control a level of an image signal applied to the pixel electrode, and a data line connected to the pixel switching transistor, the method comprising:

forming a data line terminal on a substrate, the data line terminal being electrically connected to the data line;

forming the pixel switching transistor on a material separated from the substrate, the pixel switching transistor including a source region, a drain region, and a gate electrode;

forming a source terminal on the material separated from the substrate, the source terminal being connected to the source region;

disposing the pixel switching transistor on the substrate and electrically connecting the source terminal to the data line terminal, after forming each of the data line terminal, the pixel switching transistor, and the source terminal.

18. A method for manufacturing an electro-optical panel comprising the method of manufacturing the active matrix substrate according to claim 17.

19. A method for manufacturing an active matrix substrate as set forth in claim 17, further comprising forming the data line on the substrate including forming a data line terminal.

20. A method for manufacturing an active matrix substrate as set forth in claim 17, further comprising:

forming a scanning line on the substrate;

forming on the substrate a scanning line terminal adapted to be electrically connected the scanning line;

forming on the material separated from the substrate a gate terminal adapted to be electrically connected to the gate electrode; and mounting the pixel switching transistor including connecting the gate terminal to the scanning line terminal, after the steps of forming the scanning line, the scanning line terminal and the gate terminal.

21. A method for manufacturing an active matrix substrate as set forth in claim 17, further comprising:

forming on the substrate a pixel electrode terminal adapted to be electrically connected to the pixel electrode; and forming on the material separated from the substrate a drain terminal adapted to be electrically connected to the drain region;

mounting the pixel switching transistor including connecting the drain terminal to the pixel electrode terminal, after the steps of forming the pixel electrode terminal and the drain terminal.

22. A method for manufacturing an active matrix substrate as set forth in claim 17 further comprising:

forming a scanning line on the substrate;

forming on the substrate a scanning line terminal adapted to be electrically connected to the scanning line;

forming on the substrate a pixel electrode terminal adapted to be electrically connected to the pixel electrode;

forming on the material separated from the substrate a gate terminal adapted to be electrically connected to the gate electrode; and forming on the material separated from the substrate a drain terminal adapted to be electrically connected to the drain region; and mounting the pixel switching transistor including connecting the gate terminal to the scanning line terminal and connecting the drain terminal to the pixel electrode terminal, after the steps of forming the scanning line, the scanning line terminal, the pixel electrode terminal, the gate terminal, and the drain terminal.

23. A method for manufacturing an active matrix substrate including a pixel electrode, a pixel switching transistor adapted to control a level of an image signal applied to the pixel electrode, and a scanning line connected to the pixel switching transistor, the method comprising:

forming a scanning line terminal on a substrate, the scanning line terminal being electrically connected to the scanning line;

forming the pixel switching transistor on a material separated from the substrate, the pixel switching transistor including a source region, a drain region, and a gate electrode;

forming a gate terminal on the material separated from the substrate, the gate terminal being connected to the gate electrode; and disposing the pixel switching transistor on the substrate and electrically connecting the gate terminal to the scanning line terminal, after forming each of the scanning line terminal, the pixel switching transistor, and the gate terminal.

24. A method for manufacturing an electro-optical panel comprising the method of manufacturing the active matrix substrate according to claim 23.

25. A method for manufacturing an active matrix substrate as set forth in claim 17, further comprising forming the scanning line and a scanning line terminal on the substrate.

26. A method for manufacturing an active matrix substrate as set forth in claim 23, further comprising:

forming on the substrate a pixel electrode terminal adapted to be electrically connected to the pixel electrode; and forming on the material separated from the substrate a drain terminal adapted to be electrically connected to the drain region;

mounting the pixel switching transistor including connecting the drain terminal to the pixel electrode terminal, after the steps of forming the pixel electrode terminal and the drain terminal.

27. A method for manufacturing an active matrix substrate including a pixel electrode, a pixel switching transistor adapted to control a level of an image signal applied to the pixel electrode, the method comprising:

forming a pixel electrode terminal on a substrate, the pixel electrode terminal being electrically connected to the pixel electrode;

forming the pixel switching transistor on a material separated from the substrate, the pixel switching transistor including a source region, a drain region, and a gate electrode;

forming a drain terminal on the material separated from the substrate, the drain terminal being connected to the drain region; and disposing the pixel switching transistor on the substrate and electrically connecting the drain terminal to the pixel electrode terminal, after forming each of the pixel electrode terminal, the pixel switching transistor, and the drain terminal.

28. A method for manufacturing an electro-optical panel comprising the method of manufacturing the active matrix substrate according to claim 27.

29. A method for manufacturing an active matrix substrate as set forth in claim 27, further comprising forming the pixel electrode and a pixel electrode terminal on the substrate.

* * * * *

UNITED STATES PATENT AND TRADEMARK OFFICE
CERTIFICATE OF CORRECTION

PATENT NO. : 6,771,239 B1
DATED : August 3, 2004
INVENTOR(S) : Kenji Uchiyama

It is certified that error appears in the above-identified patent and that said Letters Patent is hereby corrected as shown below:

<u>Column 16,</u>
Line 38, please change "mountings" to -- mounting --

Signed and Sealed this

Ninth Day of November, 2004

JON W. DUDAS
*Director of the United States Patent and Trademark Office*